R. SCHUSTER,
GALVANIC BATTERY.
APPLICATION FILED MAR. 3, 1917.
1,240,886.
Patented Sept. 25, 1917.
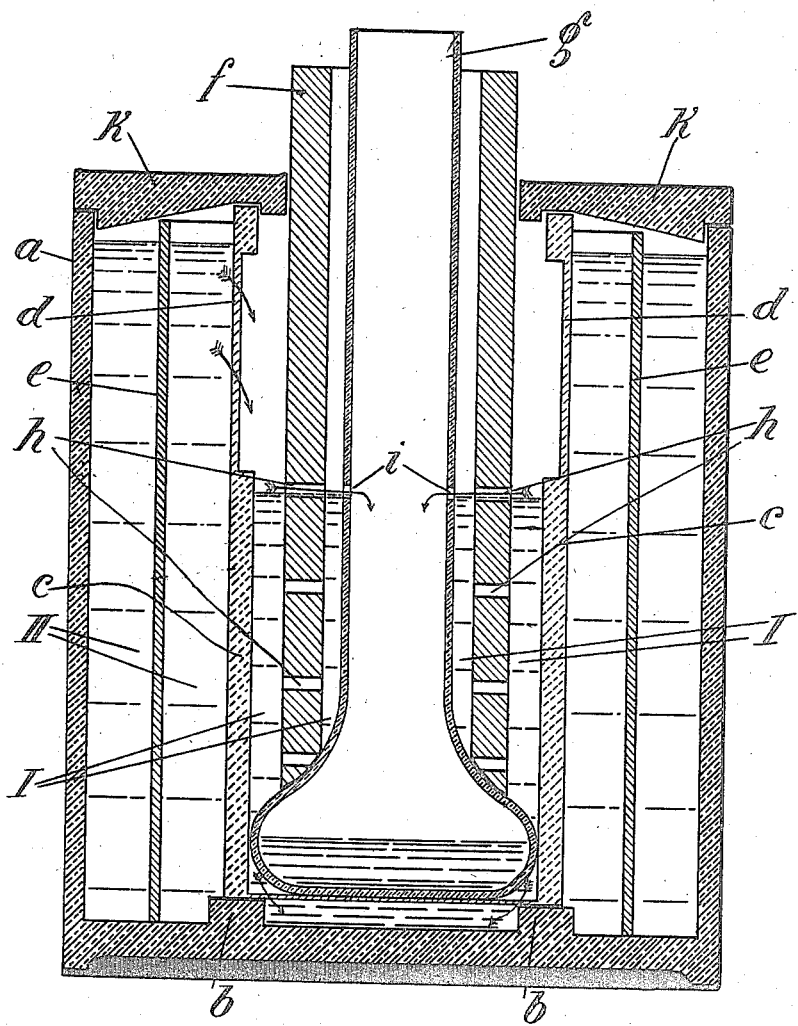
INVENTOR
Richard Schuster
by Paul P. Schilling
his attorney

UNITED STATES PATENT OFFICE.

RICHARD SCHUSTER, OF PUPPLING, BAVARIA, GERMANY, ASSIGNOR TO SCHUSTER-PATENT-GESELLSCHAFT M. B. H., OF BERLIN, GERMANY.

GALVANIC BATTERY.

1,240,886.  Specification of Letters Patent.  Patented Sept. 25, 1917.

Application filed March 3, 1917. Serial No. 152,351.

*To all whom it may concern:*

Be it known that I, RICHARD SCHUSTER, a subject of the German Emperor, and residing at Puppling, Bavaria, German Empire, have invented certain new and useful Improvements in Galvanic Batteries, of which the following is a specification.

The present invention has reference to improvements in galvanic primary batteries and relates more particularly to improvements in the type of battery described by me in my pending application for a United States patent filed December 16, 1915, Serial Number 67,195, and the particular object of the present invention is to do away with certain disadvantages attaching to the use of the two-part standpipe there described as serving to receive the products of decomposition to relieve the internal resistance of the cell.

The two-part standpipe of my prior invention has the drawback that together with the waste products also fresh parts of the active electrolytes are eliminated, which, obviously, unduly weakens the action and the life of the cell.

According to the present invention I discard the overflow pipe within the outer standpipe and provide the latter with a series of annularly disposed passages or ports through which the eliminated decomposition products, water and salts, can freely pass over into the interior of the one-part standpipe.

The invention will best be understood when described with reference to the accompanying drawing, which shows a vertical section through a cell built-up according to my invention.

The conventional outer container $a$ of impervious material, is closed by the profiled cover plate $k$ and is provided with bottom rests $b$ for supporting the porous cell $c$. The latter, which for purposes fully described in another co-pending application is of varying cross-section or permeability, allows the outer electrolyte II, containing the zinc anode $e$, to diffuse through its upper portion $d$ of reduced resistance to the electrolyte I, containing the carbon cathode $f$. The standpipe $g$, which may be of any suitable shape and not necessarily of the bellied type illustrated, rests on the bottom of the porous cup and is surrounded by or supports the annular carbon element $f$ which is provided with radially directed ports $h$. In the wall of the standpipe a ring of perforations $i$ is provided at about the normal level of the cathode electrolyte and that of the uppermost ring of carbon ports, as clearly shown in the drawing.

The operation of the cell is the following: The electrolyte II diffusing through the upper portion $d$ of the porous cup spreads over the surface of the electrolyte I and, combining with it, forms water and salts, which owing to the higher specific gravity of the electrolyte I cannot sink, but would raise its level until the porous cup would overflow. Moreover, the electrolyte I would be diluted and a counter pressure would be set up within the cell which would interfere with the proper generation of oxygen by the electrolyte I. The consumption of zinc would also be enhanced by reason of the acid in the electrolyte I attacking the zinc member.

In the new battery the salt and water formations, owing to their lower specific gravity relative to the electrolyte I, will readily flow over through the perforations $i$ into the central standpipe $g$.

What I claim as new is:—

1. In combination with a galvanic battery having an anode electrolyte and a cathode electrolyte, means for eliminating the products of decomposition thereof consisting of a perforated standpipe within the cathode electrolyte.

2. In combination with a galvanic battery having an anode electrolyte and a cathode electrolyte, means for eliminating the products of decomposition thereof, consisting of an impervious standpipe within said cathode electrolyte having overflow perforations at the height of the normal cathode electrolyte level.

3. In a galvanic battery, in combination, an outer container, a porous cell, an anode and an electrolyte in the space between said outer container and said porous cell, a cathode and an electrolyte in said porous cell, and a standpipe having a ring of radially directed perforations arranged within said cathode electrolyte, substantially as and for the purpose set forth.

4. In a galvanic battery, in combination, an outer container, a porous cell, an anode and an electrolyte in the space between said outer container and said porous cell, a cathode and an electrolyte in said porous cell, said cathode having series of radially directed ports, and a standpipe having overflow perforations within said cathode electrolyte, the uppermost of said cathode ports, the said overflow perforations and the normal level of said cathode electrolyte being in substantial alinement.

In witness whereof I have hereunto set my hand.

RICHARD SCHUSTER.